United States Patent
Tan et al.

(10) Patent No.: US 10,763,926 B2
(45) Date of Patent: Sep. 1, 2020

(54) ENHANCED SOUNDING REFERENCE SYMBOL SOUNDING TECHNIQUE FOR UPLINK CODEBOOK-BASED TRANSMISSION

(71) Applicant: NOKIA TECHNOLOGIES OY, Espoo (FI)

(72) Inventors: Jun Tan, Lake Zurich, IL (US); Eugene Visotsky, Buffalo Grove, IL (US); Fred Vook, Schaumburg, IL (US); Bill Hillery, Lafayette, IN (US)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/156,800

(22) Filed: Oct. 10, 2018

(65) Prior Publication Data

US 2020/0119786 A1  Apr. 16, 2020

(51) Int. Cl.
*H04B 7/04* (2017.01)
*H04B 7/0456* (2017.01)
*H04B 7/0404* (2017.01)

(52) U.S. Cl.
CPC ......... *H04B 7/0486* (2013.01); *H04B 7/0404* (2013.01)

(58) Field of Classification Search
CPC .................. H04B 7/0486; H04B 7/0404
See application file for complete search history.

(56) References Cited

U.S. PATENT DOCUMENTS

| 2007/0064664 A1* | 3/2007 | Kwon ............ H04L 27/2647 370/343 |
| 2013/0128833 A1* | 5/2013 | Lee ............ H04W 52/146 370/329 |
| 2017/0374638 A1* | 12/2017 | Han ............ H04J 11/00 |
| 2018/0103433 A1* | 4/2018 | Li ............ H04W 52/325 |
| 2018/0109301 A1* | 4/2018 | Nagata ............ H04B 7/0456 |

(Continued)

FOREIGN PATENT DOCUMENTS

WO   2018/128504 A1   7/2018

OTHER PUBLICATIONS

International Search Report and Written Opinion corresponding to PCT/EP2019/076727, dated Dec. 6, 2019.

(Continued)

*Primary Examiner* — Jean B Corrielus
(74) *Attorney, Agent, or Firm* — Squire Patton Boggs (US) LLP

(57) ABSTRACT

Various communication systems may benefit from improved sounding reference symbol sounding techniques. An apparatus may comprise at least one memory comprising computer program code and at least one processor. The at least one memory and the computer program code are configured, with the at least one processor, to cause the apparatus at least to precode at least one uplink sounding reference symbol based upon at least one initial rank indicator and at least one first vector/matrix received from a network entity. The apparatus further transforms the first vector/matrix and a second vector matrix received from the network entity into a third vector/matrix based upon a final rank indicator received from the network entity. The apparatus further transmits data based upon the third vector/matrix.

8 Claims, 5 Drawing Sheets

(56) References Cited

U.S. PATENT DOCUMENTS

2019/0045542 A1* 2/2019 Yang .................... H04B 7/0456
2019/0132098 A1* 5/2019 Wernersson .......... H04L 5/0048

OTHER PUBLICATIONS

Samsung: "Codebook-based UL transmission", 3GPP TSG RAN WG1 Meeting #91, Reno, USA, Nov. 1-Dec. 1, 2017, R1-1721399, 16 pages.
Alcatel-Lucent et al., "Way Forward on 8Tx Codebook for Rel.10 DL MIMO", 3GPP TSG RAN WG1 62, Madrid, Spain, Aug. 23-27, 2010, R1-105011, 6 pages.
MCC Support, "Final Report of 3GPP TSG RAN WG1 #88, v.1.0.0 (Athens, Greece, Feb. 13-17, 2017)", 3GPP TSG RAN WG1 Meeting #88bis Spokane, USA, Apr. 3-7, 2017, R1-1704172, 152 pages.
MCC Support, "Final Report of 3GPP TSG RAN WG1 #AH1_NR v.1.0.0 (Spokane, USA, Jan. 16-20, 2017)", 3GPP TSG RAN WG1 Meeting #88, Athens, Greece, Feb. 13-17, 2017, R1-1701553, 106 pages.

* cited by examiner

ENHANCED SOUNDING REFERENCE SYMBOL SOUNDING TECHNIQUE FOR UPLINK CODEBOOK-BASED TRANSMISSION

BACKGROUND

Field

Various communication systems may benefit from improved sounding reference symbol sounding techniques. For example, certain communication systems may benefit from improved sounding reference symbol sounding techniques by using a two-stage sounding process.

Description of the Related Art

Uplink Multiple-Input and Multiple-Output (UL MIMO) supports up to 4 transmission ports associated with two types of transmission schemes: codebook-based transmissions and non-codebook-based transmissions in Rel-15 NR. For user equipment utilizing a high number of uplink transmission ports, such as 8, sounding reference symbol (SRS) sounding may be used to acquire uplink Channel State Information (CSI) information in both Time-Domain Duplex (TDD) and Frequency-Domain Duplex (FDD). For example, with TDD, channel reciprocity may be used during downlink to acquire uplink CSI. However, channel reciprocity is incompatible with FDD, and frequently experiences challenges associated with transmitting/receiving calibration due to the lack of its universal applicability.

Additionally, traditional SRS sounding techniques attempt to sound all potential transmission ports to obtain a complete CSI. For example, an 8-port UE may need to sound all 8 UL transmission ports, requiring 8 SRS resources. In this scenario, as the number of uplink transmission ports increases, the required SRS resources increases as well, eventually creating a more complex process for uplink CSI acquisition. In order to support features such as integrated automatic backhaul (IAB), machine type communication (MTC), and vehicle-to-everything communication (V2X), enhanced uplink transmission capabilities are needed with respect to their transmission schemes. For example, IAB may require a high throughput for backhaul uplinks, while V2X and MTC may require high quality uplinks. Because each of these features may require a high number of transmission ports in uplink, a high but flexible throughput uplink design is desirable.

SUMMARY

In accordance with certain embodiments, a method may include precoding at least one uplink sounding reference symbol based upon at least one initial rank indicator and at least one first vector/matrix received from a network entity. The method may further include transforming the first vector/matrix and a second vector matrix received from the network entity into a third vector/matrix based upon a final rank indicator received from the network entity. The method may further include transmitting data based upon the third vector/matrix.

In accordance with certain embodiments, an apparatus may include at least one processor and at least one memory including computer program code. The at least one memory and the computer program code can be configured to, with the at least one processor, cause the apparatus to at least precode at least one uplink sounding reference symbol based upon at least one initial rank indicator and at least one first vector/matrix received from a network entity. The at least one memory and the computer program code can be configured to, with the at least one processor, further cause the apparatus to at least transform the first vector/matrix and a second vector matrix received from the network entity into a third vector/matrix based upon a final rank indicator received from the network entity. The at least one memory and the computer program code can be configured to, with the at least one processor, further cause the apparatus to at least transmit data based upon the third vector/matrix.

In accordance with certain embodiments, an apparatus may include means for precoding at least one uplink sounding reference symbol based upon at least one initial rank indicator and at least one first vector/matrix received from a network entity. The apparatus may further include means for transforming the first vector/matrix and a second vector matrix received from the network entity into a third vector/matrix based upon a final rank indicator received from the network entity. The apparatus may further include means for transmitting data based upon the third vector/matrix.

In accordance with certain embodiments, a non-transitory computer readable medium can, in certain embodiments, be encoded with instructions that may, when executed in hardware, perform a process. The process may include a method that may precode at least one uplink sounding reference symbol based upon at least one initial rank indicator and at least one first vector/matrix received from a network entity. The process may include a method that may further transform the first vector/matrix and a second vector matrix received from the network entity into a third vector/matrix based upon a final rank indicator received from the network entity. The process may include a method that may further transmit data based upon the third vector/matrix.

In accordance with certain embodiments, a computer program product may have instructions encoded for performing a process. The process may include a method that may precode at least one uplink sounding reference symbol based upon at least one initial rank indicator and at least one first vector/matrix received from a network entity. The process may include a method that may further transform the first vector/matrix and a second vector matrix received from the network entity into a third vector/matrix based upon a final rank indicator received from the network entity. The process may include a method that may further transmit data based upon the third vector/matrix.

In accordance with certain embodiments, an apparatus may include circuitry configured to precode at least one uplink sounding reference symbol based upon at least one initial rank indicator and at least one first vector/matrix received from a network entity. The apparatus may further include circuitry configured to transform the first vector/matrix and a second vector matrix received from the network entity into a third vector/matrix based upon a final rank indicator received from the network entity. The apparatus may further include circuitry configured to transmit data based upon the third vector/matrix.

In accordance with certain embodiments, a method may include, based upon at least one a-port sounding reference symbol received from a user equipment, determining at least one rank supported by an a-port channel. The method may further include based upon at least one b-port sounding reference symbol received from the user equipment, determining at least one rank supported by a b-port channel and at least one optimal b-port precoding matrix indicator. The method may further include transmitting at least one vector/matrix to the user equipment.

In accordance with certain embodiments, an apparatus may include at least one processor and at least one memory including computer program code. The at least one memory and the computer program code can be configured to, with the at least one processor, cause the apparatus to at least, based upon at least one a-port sounding reference symbol received from a user equipment, determine at least one rank supported by an a-port channel. The at least one memory and the computer program code can be configured to, with the at least one processor, further cause the apparatus to at least, based upon at least one b-port sounding reference symbol received from the user equipment, determine at least one rank supported by a b-port channel and at least one optimal b-port precoding matrix indicator. The at least one memory and the computer program code can be configured to, with the at least one processor, further cause the apparatus to at least transmit at least one vector/matrix to the user equipment.

In accordance with certain embodiments, an apparatus may include means for, based upon at least one a-port sounding reference symbol received from a user equipment, determining at least one rank supported by an a-port channel. The apparatus may further include means for, based upon at least one b-port sounding reference symbol received from the user equipment, determining at least one rank supported by a b-port channel and at least one optimal b-port precoding matrix indicator. The apparatus may further include means for transmitting at least one vector/matrix to the user equipment.

In accordance with certain embodiments, a non-transitory computer readable medium can, in certain embodiments, be encoded with instructions that may, when executed in hardware, perform a process. The process may include a method that may, based upon at least one a-port sounding reference symbol received from a user equipment, determine at least one rank supported by an a-port channel. The process may include a method that may further, based upon at least one b-port sounding reference symbol received from the user equipment, determine at least one rank supported by a b-port channel and at least one optimal b-port precoding matrix indicator. The process may include a method that may further transmit at least one vector/matrix to the user equipment.

In accordance with certain embodiments, a computer program product may have instructions encoded for performing a process. The process may include a method that may, based upon at least one a-port sounding reference symbol received from a user equipment, determine at least one rank supported by an a-port channel. The process may include a method that may further, based upon at least one b-port sounding reference symbol received from the user equipment, determine at least one rank supported by a b-port channel and at least one optimal b-port precoding matrix indicator. The process may include a method that may further transmit at least one vector/matrix to the user equipment.

In accordance with certain embodiments, an apparatus may include circuitry configured to, based upon at least one a-port sounding reference symbol received from a user equipment, determine at least one rank supported by an a-port channel. The apparatus may further include circuitry configured to, based upon at least one b-port sounding reference symbol received from the user equipment, determine at least one rank supported by a b-port channel and at least one optimal b-port precoding matrix indicator. The apparatus may further include circuitry configured to transmit at least one vector/matrix to the user equipment.

BRIEF DESCRIPTION OF THE DRAWINGS

For proper understanding of the invention, reference should be made to the accompanying drawings, wherein.

DETAILED DESCRIPTION

Certain embodiments discussed herein may provide a procedure for user equipment to send periodic sounding reference symbols (SRS). For example, some embodiments may send a 4-port SRS on a long-term basis, followed by sending a (2×rank)-port SRS, as needed. Thus, SRS overhead may be scaled based upon the expected rank of the uplink channel Certain embodiments may also enable the determination of precoded channels, which may mitigate transmission quality degradation. Certain embodiments are, therefore, directed to improvements in computer-related technology, specifically, by conserving network resources and reducing power consumption of the UE and/or a network entity located within the network.

Figure 1:
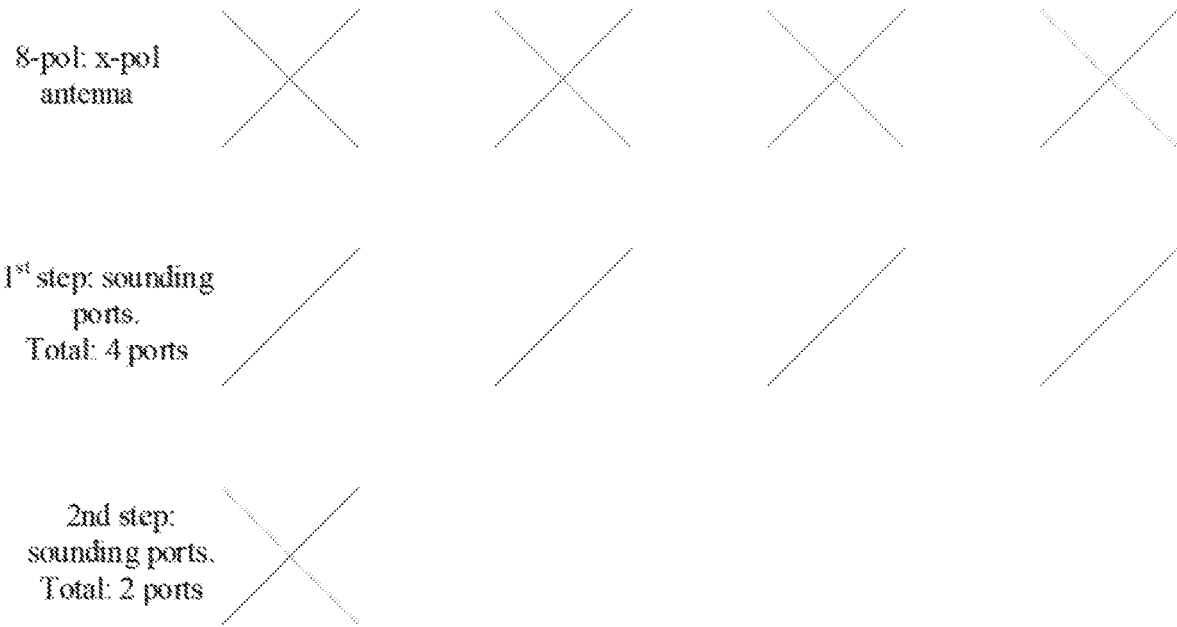
FIG. 1 illustrates an example of an uplink sounding procedure for 8 transmission ports with an x-polarization structure according to certain embodiments.
Figure 2:
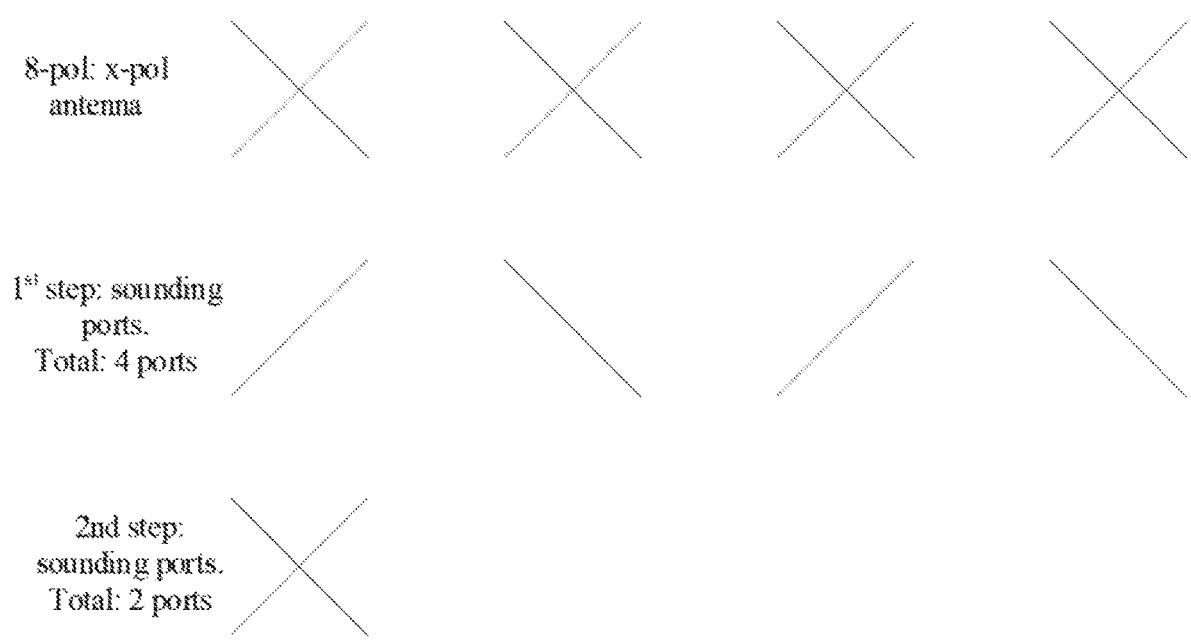
FIG. 2 illustrates another example of an uplink sounding procedure for 8 transmission ports with an alternative selection of sounding ports according to certain embodiments.

For user equipment using an x-polarization antenna structure, one approach is proposed to reduce SRS sounding efforts in uplink transmissions. Instead of sounding all transmission ports, only a partial set of transmission ports are sounded using SRS. For example, FIGS. 1 and 2 illustrate examples of sounding only one polarization for each cross-polarization antenna port, as will be discussed in further detail below.

Figure 3:
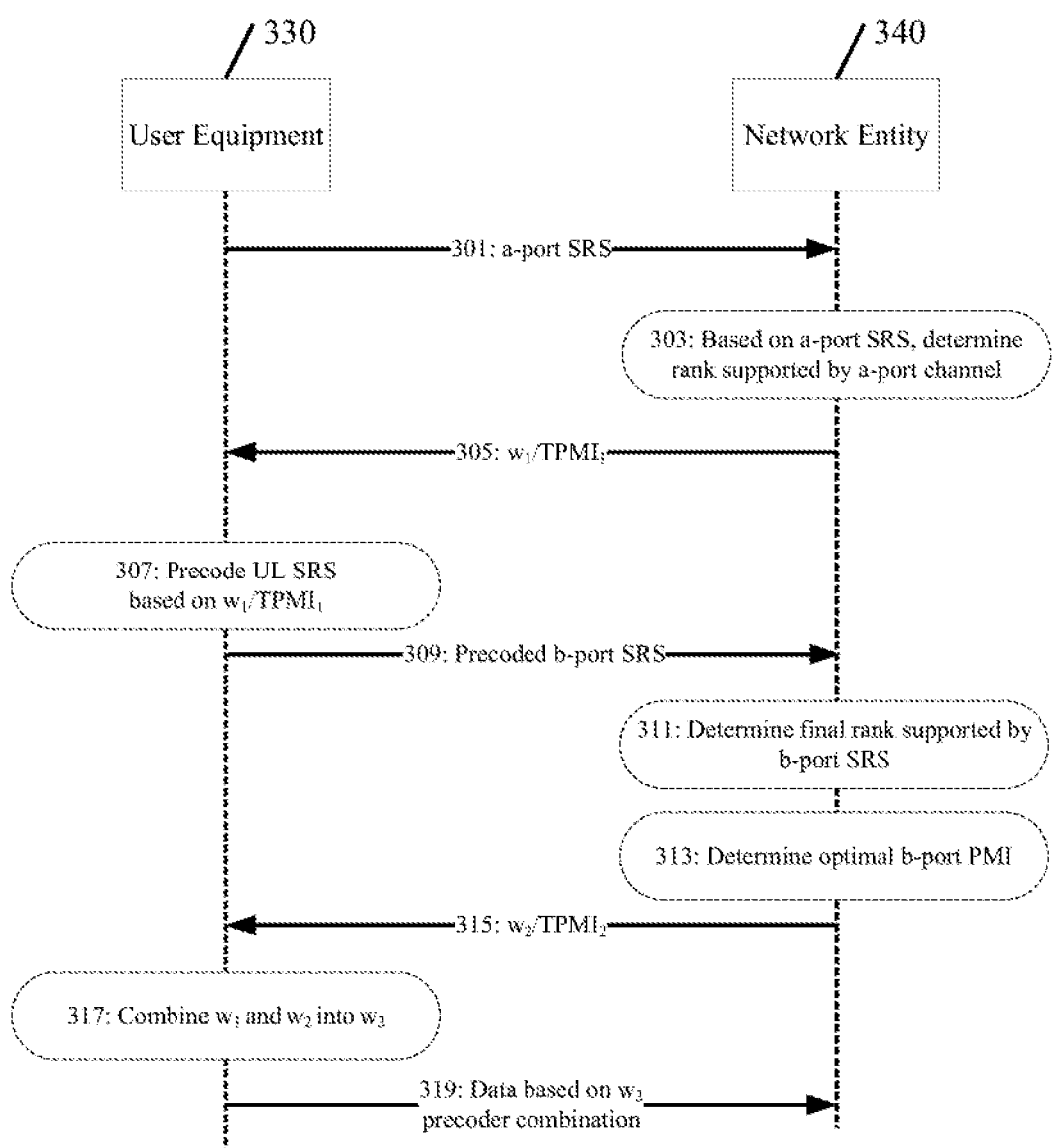
FIG. 3 illustrates an example of a signaling diagram according to certain embodiments.
Figure 6:
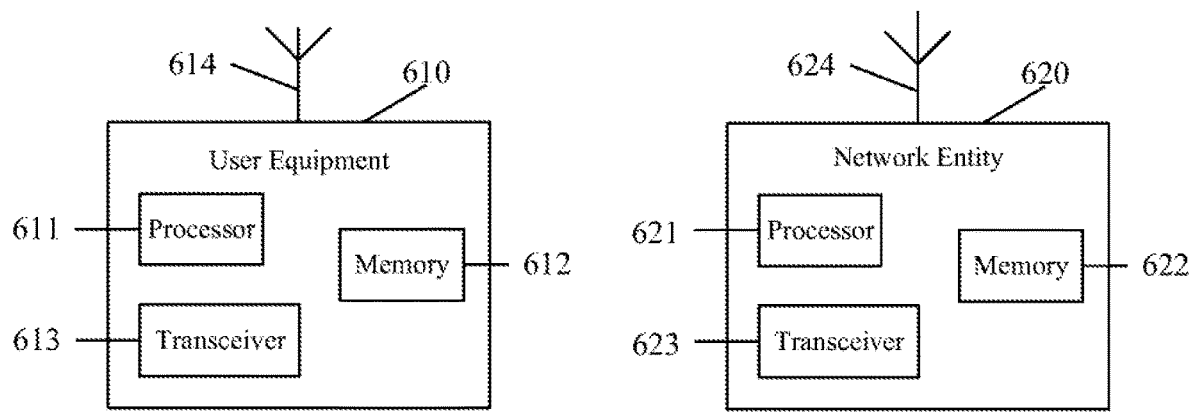
FIG. 6 illustrates a system according to certain embodiments.

FIG. 3 illustrates an example of a signal flow diagram of signaling between user equipment (UE) 330, such as user equipment 610, and network entity (NE) 340, such as network entity 620, both of which are illustrated in FIG. 6. As an example, UE 330 may have a linear cross-polarization array, such as with 8 total elements, as illustrated in FIGS. 1 and 2. Beginning at step 301, UE 330 may transmit an a-port SRS to NE 340. For example, the a-port SRS may be associated with a particular number of ports, such as a=4. The number of a-ports may be equal to the number of polarization ports of UE 330, or may be less than the number of polarization ports of UE 330. The number of a-ports may be arbitrarily selected by UE 330, and may indicate particular polarized ports based upon common techniques applied by UE 330 and/or NE 340, such as according to a codebook for indexing polarized antenna ports. In step 303, NE 340 may determine at least one rank supported by an a-port channel. In some embodiments, the determination may be based upon the a-port SRS.

In step 305, NE 340 may transmit at least one initial rank indicator (RI) and/or at least one first vector/matrix, such as $w_1$, which may contain at least one wideband component of associated precoders, to UE 330. In some embodiments, the initial RI and/or first vector/matrix may be transmitted on a longer-term basis, for example, according to each $n^{th}$ feedback interval, where n is an integer. The at least one first vector/matrix may be based upon semi-open loop transmission.

In some embodiments, the at least one first vector/matrix may be of size P×v, where P is the number of antenna ports of UE 330 and v is the rank supported by an a-port channel. The output signal of the antenna ports may be represented by $y=w_1 x$, where x comprises a rank-v data symbol vector with size of v×1.

In some embodiments, semi-open loop transmission schemes may be supported with the at least one initial rank indicator (RI). For example, as shown in FIG. 1, the diversity ports are designated with (/ / / /) and (\ \ \ \), with each group corresponding to one polarization. And as shown in FIG. 2, the diversity ports are designated with (/ \ / \) and (\ / \ /). Using the at least one initial RI, UE 330 may apply diversity transmission schemes among its two diversity ports, such as precoder cycling, delay diversity, and/or Alamouti-like schemes such as spatial frequency block code (SFBC) and spatial time block code (STBC).

In step 307, UE 330 may use the at least one first vector/matrix from step 305: w1/TPMI1 to precode at least one uplink SRS. In some embodiments, one or more elements and/or one or more opposing elements may be precoded using the at least one first vector/matrix. In various embodiments, the precoded SRS may have a particular number of ports b, such as 2.

In step 309, UE 330 may transmit the at least one b-port precoded SRS to NE 340. In step 311, NE 340 may determine a rank indicator supported by a b-port channel. In some embodiments, the rank indicator may be a number, for example, between 1 and 2. In step 313, NE 340 may determine at least one optimal b-port precoding matrix indicator.

In step 315, NE 340 may transmit the final rank indicator and/or at least one second vector/matrix, such as $w_2$, which may contain at least one sub-band specific component of associated precoders, to UE 330. In some embodiments, the at least one second vector/matrix may be of size b by the final rank indicator determined in step 311. In various embodiments, NE 340 may determine the at least one second vector/matrix based upon a 2-column channel, where the columns are formed by applying the at least one first vector/matrix to the elements and/or opposing elements.

In step 317, UE 330 may combine the at least one first vector/matrix containing the wideband component of the precoders from Step 305: w1/TPMI1 with the at least one second vector/matrix containing the sub-band specific components of the precoders from Step 315: w2/TPMI2 into at least the final vector/matrix precoder. For example, UE 330 may determine $w_3$ as $w_3=w_1 \cdot w_2$. In step 319, UE 330 may transmit data according to the at least one third vector/matrix precoder.

Figure 4:
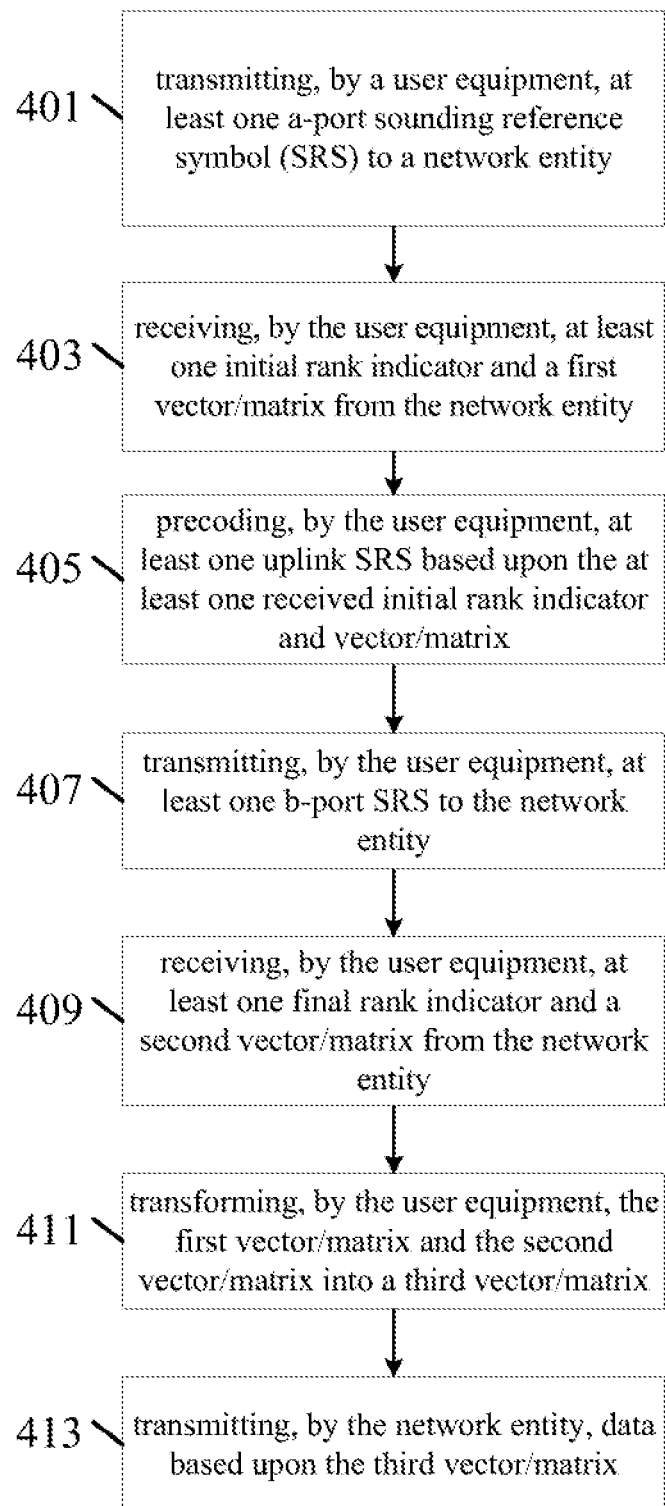
FIG. 4 illustrates an example of a method performed by a user equipment according to certain embodiments.

FIG. 4 illustrates an example of a method according to certain embodiments. In step 401, a user equipment, such as UE 610 illustrated in FIG. 6, may transmit at least one a-port SRS to a network entity, such as NE 620 illustrated in FIG. 6. For example, at least one a-port SRS may be associated with a particular number of ports, such as a=4. The number of a-ports may be equal to the number of polarization ports of UE 330, or may be less than the number of polarization ports of UE 330. The number of a-ports may be arbitrarily selected by UE 330, and may indicate particular polarized ports based upon common techniques applied by UE 330 and NE 340, such as according to a codebook for indexing polarized antenna ports.

In step 403, the user equipment may receive at least one initial RI and/or at least one first vector/matrix, such as $w_1$, which may contain at least one wideband component of associated precoders, from the network entity. In some embodiments, the initial RI and/or first vector/matrix may be transmitted on a longer-term basis, for example, according to each $n^{th}$ feedback interval, where n is an integer. The at least one first vector/matrix may be based upon semi-open loop transmission.

In some embodiments, the at least one first vector/matrix may be of size P×v, where P is the number of antenna ports of the user equipment and v is the rank supported by an a-port channel. The output signal of the antenna ports may be represented by $y=w_1 x$, where x comprises a rank-v data symbol vector with size of v×1.

In some embodiments, semi-open loop transmission schemes may be supported with the at least one initial rank indicator (RI). For example, as shown in FIG. 1, the diversity ports are designated with (/ / / /) and (\ \ \ \), with each group corresponding to one polarization. And as shown in FIG. 2, the diversity ports are designated with (/ \ / \) and (\ / \ /). Using the at least one initial RI, UE 330 may apply diversity transmission schemes among its two diversity ports, such as precoder cycling, delay diversity, and/or Alamouti-like schemes such as SFBC and STBC.

In step 405, the user equipment may use the at least one first vector/matrix to precode at least one uplink SRS. In some embodiments, one or more elements and/or one or more opposing elements may be precoded using the at least one first vector/matrix. In various embodiments, the SRS may be a particular number of ports b, such as 2. In step 407, the user equipment may transmit the at least one b-port precoded SRS to the network entity.

In step 409, the user equipment may receive a final rank indicator and/or at least one second vector/matrix, such as $w_2$, which may contain at least one sub-band specific component of associated precoders, from the network entity. In some embodiments, the at least one second vector/matrix may be of size b by the final rank indicator.

In step 411, the user equipment may combine the at least one first vector/matrix containing the wideband component of the precoders with the at least one second vector/matrix containing the sub-band specific components of the precoders into at least one third vector/matrix precoder. For example, the user equipment may determine $w_3$ as $w_3=w_1 \cdot w_2$. In step 413, the user equipment may transmit data according to the at least one third (final) vector/matrix precoder.

Figure 5:
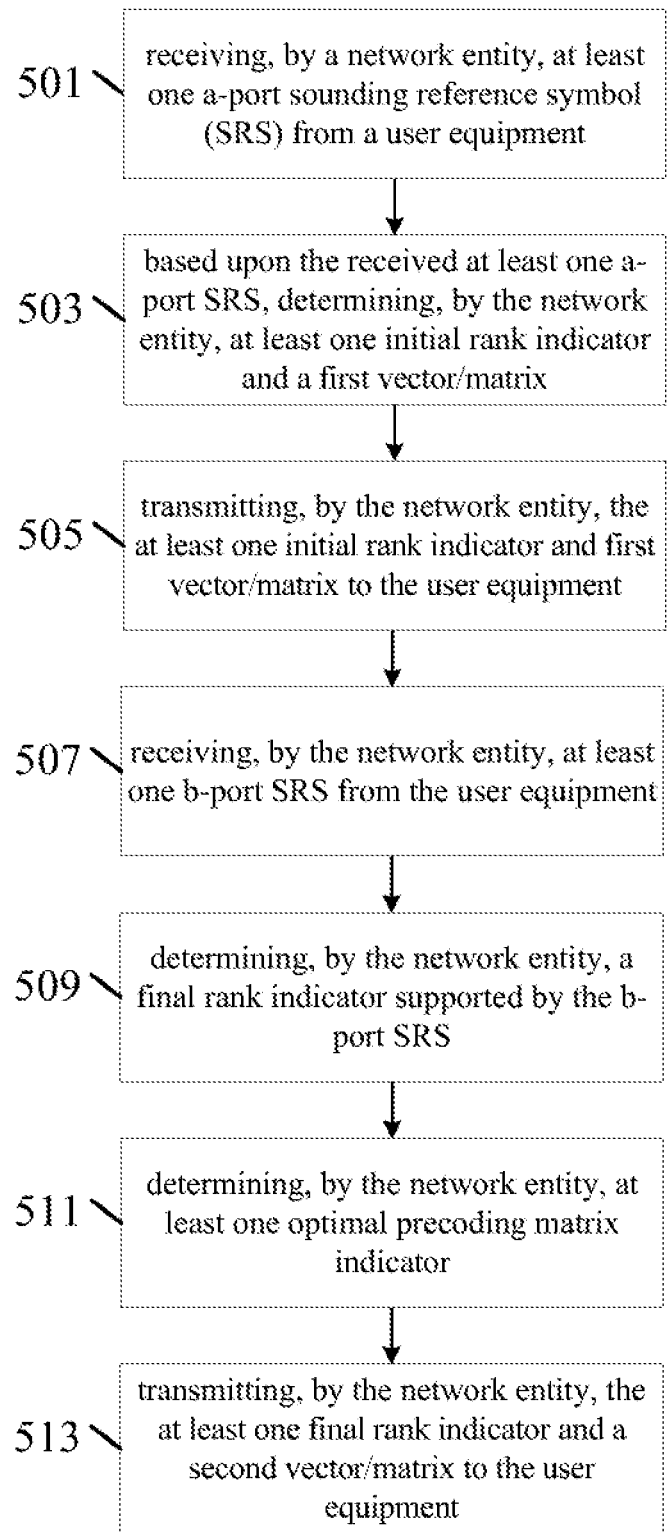
FIG. 5 illustrates an example of a method performed by a network entity according to certain embodiments.

FIG. 5 illustrates an example of a method performed by a network entity according to certain embodiments. In step 501, a network entity, such as NE 620 illustrated in FIG. 6, may receive an a-port SRS from a user equipment, such as UE 610. For example, the a-port SRS may be associated with a particular number of ports, such as a=4. The number of a-ports may be equal to the number of polarization ports of the user equipment, or may be less than the number of polarization ports of UE 330. The number of a-ports may be arbitrarily selected by the user equipment, and may indicate particular polarized ports based upon common techniques applied by the user equipment and/or the network entity, such as according to a codebook for indexing polarized antenna ports.

In step 503, the network entity may determine at least one rank supported by an a-port channel. In some embodiments, the determination may be based upon the a-port SRS. In step 505, the network entity may transmit at least one initial RI and/or at least one first vector/matrix, such as $w_1$, which may contain at least one wideband component of associated precoders, to the user equipment. In some embodiments, the initial RI and/or first vector/matrix may be transmitted on a longer-term basis, for example, according to each $n^{th}$ feedback interval, where n is an integer. The at least one first vector/matrix may be based upon semi-open loop transmission.

In some embodiments, the at least one first vector/matrix may be of size P×v, where P is the number of antenna ports of the user equipment and v is the rank supported by an a-port channel. The output signal of the antenna ports may be represented by $y=w_1x$, where x comprises a rank-v data symbol vector with size of v×1.

In some embodiments, semi-open loop transmission schemes may be supported with the at least one initial RI. For example, as shown in FIG. 1, the diversity ports are designated with (/ / / /) and (\ \ \ \), with each group corresponding to one polarization. And as shown in FIG. 2, the diversity ports are designated with (/ \ / \) and (\ / \ /).

In step 507, the network entity may receive at least one b-port precoded SRS from the user equipment. In step 509, the network entity may determine a final rank indicator supported by a b-port channel. In some embodiments, the final rank indicator may be a number, for example, between 1 and 2. In step 511, the network entity may determine at least one optimal b-port precoding matrix indicator.

In step 513, the network entity may transmit the final rank indicator and/or at least one second vector/matrix, such as $w_2$, which may contain at least one sub-band specific component of associated precoders, to the user equipment. In some embodiments, the at least one second vector/matrix may be of size b by the final rank indicator. In various embodiments, the network entity may determine the at least one second vector/matrix based upon a 2-column channel, where the columns are formed by applying the at least one first vector/matrix to the elements and/or opposing elements.

FIG. 6 illustrates a system according to certain embodiments. It should be understood that each signal or block in FIGS. 3-5 may be implemented by various means or their combinations, such as hardware, software, firmware, one or more processors and/or circuitry. In one embodiment, a system may include several devices, such as, for example, user equipment 610 and/or network entity 620. The system may include more than one user equipment 610 and more than one network entity 620.

User equipment 614 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

Network entity 620 may be a CBSD, a base station, an access point, an access node, an eNB, a gNB, a server, a host, a MME, a S-GW, a P-GW, a PCRF, a P-CSCF, E/CSCF, or any other network entity that may communicate with user equipment 610.

Each of these devices may include at least one processor or control unit or module, respectively indicated as 611 and 621. At least one memory may be provided in each device, and indicated as 612 and 622, respectively. The memory may include computer program instructions or computer code contained therein. One or more transceivers 613 and 623 may be provided, and each device may also include an antenna, respectively illustrated as 614 and 624. Although only one antenna each is shown, many antennas and multiple antenna elements may be provided to each of the devices. Other configurations of these devices, for example, may be provided. For example, user equipment 610 and/or network entity 620 may be additionally configured for wired communication, in addition to wireless communication, and in such a case, antennas 614 and 624 may illustrate any form of communication hardware, without being limited to merely an antenna.

Transceivers 613 and 623 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, an apparatus, such as a user equipment or a network node, may include means for carrying out embodiments described above in relation to FIGS. 3-5. In certain embodiments, at least one memory including computer program code can be configured to, with the at least one processor, cause the apparatus at least to perform any of the processes described herein.

Processors 611 and 621 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as user equipment 610 and/or network entity 620, to perform any of the processes described above (see, for example, FIGS. 3-5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Furthermore, although FIG. 6 illustrates a system including a user equipment 610 and/or network entity 620, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. User equipment 610 may likewise be provided with a variety of configurations for communication other than communicating with network entity 620. For example, user equipment 610 may be configured for device-to-device, machine-to-machine, or vehicle-to-vehicle communication.

As shown in FIG. 6, transceivers 613 and 623 may be provided, and one or more devices may also include at least one antenna, respectively illustrated as 614 and 624. The device may have many antennas, such as an array of antennas configured for multiple input multiple output (MIMO) communications, or multiple antennas for multiple radio access technologies. Other configurations of these devices, for example, may be provided.

Transceivers 613 and 623 may be a transmitter, a receiver, or both a transmitter and a receiver, or a unit or device that may be configured both for transmission and reception.

Processors 611 and 621 may be embodied by any computational or data processing device, such as a central processing unit (CPU), application specific integrated circuit (ASIC), or comparable device. The processors may be implemented as a single controller, or a plurality of controllers or processors.

Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

The memory and the computer program instructions may be configured, with the processor for the particular device, to cause a hardware apparatus such as user equipment to perform any of the processes described below (see, for example, FIGS. 3-5). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 3-5. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The above embodiments may be applied to any communication network or wireless system. While many of the above embodiments refer to LTE or LTE-A, other embodiments may be used for 3GPP fifth generation (5G) technology, fourth generation (4G) technology, New Radio (NR) technology, and/or any wireless land access network (WLAN).

Partial Glossary

3GPP Third Generation Partnership Project
5G Fifth Generation
CSI Channel State Information
DL Downlink
FDD Frequency-Domain Duplex
IAB Integrated Automatic Backhaul
MTC Machine Type Communication
eNB Evolved Node B
LTE Long Term Evolution
MME Mobility Management Entity
NR New Radio
PMI Precoding Matrix Indicator
SRS Sounding Reference Symbol
SFBC Space Frequency Block Coding
STBC Space Time Block Coding
TDD Time-Domain Duplex
TPMI Transmitted Precoding Matrix Indicator
Tx Transmission
UE User Equipment
UL Uplink
UL-MIMO Uplink Multiple-Input and Multiple-Output
V2X Vehicle-to-Everything
Xpol Cross-polarization

We claim:

1. An apparatus, comprising:
at least one memory comprising computer program code;
at least one processor;
wherein the at least one memory and the computer program code are configured, with the at least one processor, to cause the apparatus at least to:
transmit a first at least one sounding reference signal with a first one or more sounding reference signal ports to a network node;
receive a first at least one transmit precoding matrix indicator and/or transmit rank indicator from the network node, the first at least one transmit precoding matrix indicator and/or transmit rank indicator being based on the first at least one sounding reference signal transmitted with the first one or more sounding reference signal ports;
precode a second at least one sounding reference signal based upon the first at least one transmit precoding matrix indicator and/or transmit rank indicator from the network node, and
transmit the second at least one precoded sounding reference signal with second one or more sounding reference signal ports;
receive, from the network node, a second at least one transmit precoding matrix indicator and/or transmit rank indicator in response to the transmitted second at least one precoded sounding reference signal;
determine at least one transmit precoding matrix based on the first at least one transmit precoding matrix indicator and the second at least one transmit precoding matrix indicator; and
transmit data precoded using the at least one transmit precoding matrix.

2. The apparatus according to claim 1, wherein the first one or more sounding reference signal ports comprises four sounding reference signal ports.

3. The apparatus according to claim 1, wherein the second one or more sounding reference signal ports comprises two sounding reference signal ports.

4. The apparatus according to claim 1, wherein the number of second one or more sounding reference signal ports is smaller than the number of first one or more sounding reference signal ports.

5. The apparatus according to claim 1, wherein the transmit precoding matrix corresponding to the first at least one transmit precoding matrix indicator comprises four rows and one column, wherein the number of rows corresponds to the total number of antenna ports and the number of columns corresponds to the first transmit rank indicator.

6. The apparatus according to claim 1, wherein the at least one memory and the computer program code are further configured, with the at least one processor, to cause the apparatus at least to:
apply at least one diversity transmission scheme.

7. The apparatus according to claim 1, wherein at least one diversity transmission scheme is associated with one or more of precoder cycling, delay diversity, spatial frequency block code (SFBC), and spatial time block code.

8. An apparatus, comprising:
at least one memory comprising computer program code;
at least one processor;
wherein the at least one memory and the computer program code are configured, with the at least one processor, to cause the apparatus at least to:
receive a first at least one sounding reference signal from a user equipment,
based upon the fist at least one sounding reference signal, determine a first at least one transmit precoding matrix indicator and/or transmit rank indicator;
transmit the first at least one transmit precoding matrix indicator and/or transmit rank indicator to the user equipment;
receive at least one precoded sounding reference signal from the user equipment;
based upon the at least one precoded sounding reference signal, determine a second at least one transmit precoding matrix indicator and/or transmit rank indicator;
transmit the second at least one transmit precoding matrix indicator and/or transmit rank indicator to the user equipment;
determine at least one transmit precoding matrix based on the first at least one transmit precoding matrix indicator and the second at least one transmit precoding matrix indicator; and
receive data precoded using the at least one transmit precoding matrix from the user equipment.

* * * * *